United States Patent [19]

Schwab

[11] 4,130,196
[45] Dec. 19, 1978

[54] PACKAGE ELEVATOR FOR A SHIP

[75] Inventor: Randall J. Schwab, Portland, Oreg.

[73] Assignee: Transco Northwest, Inc., Portland, Oreg.

[21] Appl. No.: 750,366

[22] Filed: Dec. 13, 1976

[51] Int. Cl.$^2$ ............................................. B65G 17/12
[52] U.S. Cl. ...................................... 198/796; 198/802
[58] Field of Search ............... 198/796, 800, 801, 802, 198/365, 607

[56] References Cited

U.S. PATENT DOCUMENTS

| 1,903,835 | 4/1933 | Olson | 198/365 X |
| 2,747,724 | 5/1956 | Kornylak | 198/796 X |
| 3,854,570 | 12/1974 | Kornylak | 198/800 X |

FOREIGN PATENT DOCUMENTS 826270  12/1931  Fed. Rep. of Germany ........... 198/796

Primary Examiner—Evon C. Blunk
Assistant Examiner—Douglas D. Watts

Attorney, Agent, or Firm—Klarquist, Sparkman, Campbell, Leigh, Hall & Whinston

[57] ABSTRACT

A package elevator for a ship includes a plurality of slotted or tined trays carried by pairs of forked followers pivotally attached to a pair of chains driven in unison in parallel endless paths with upper driving sprockets and lower idler sprockets. Each follower is keyed to a shaft journaled in a link of one of the chains, and has an inner follower arm and an outer follower arm. The arms carry follower rollers projecting into cam tracks which guide the rollers so that the trays are in return positions lying along the chains in a return course, project outwardly from the chains in an elevating course and are moved from one of these positions to the other as the trays are moved around the sprockets. The cam tracks include cam blocks having cam grooves therein which turn the follower arms and trays only 90° relative to the chains as the trays are traveling around the sprockets. Slotted or tined transfer trays may be swung from retracted positions to sloping unloading positions in the paths of the carrying trays and also are movable to horizontal loading positions.

6 Claims, 9 Drawing Figures

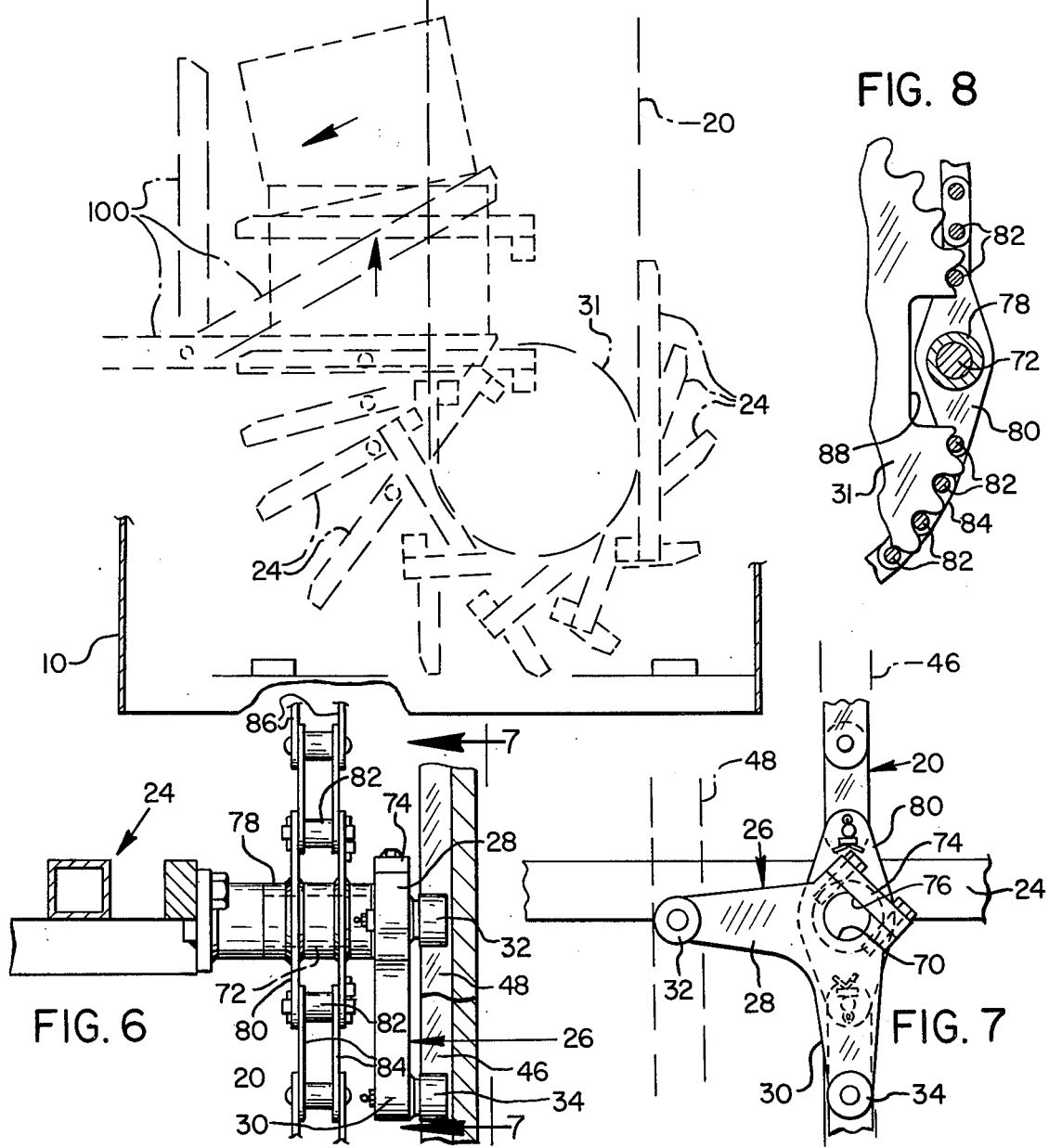

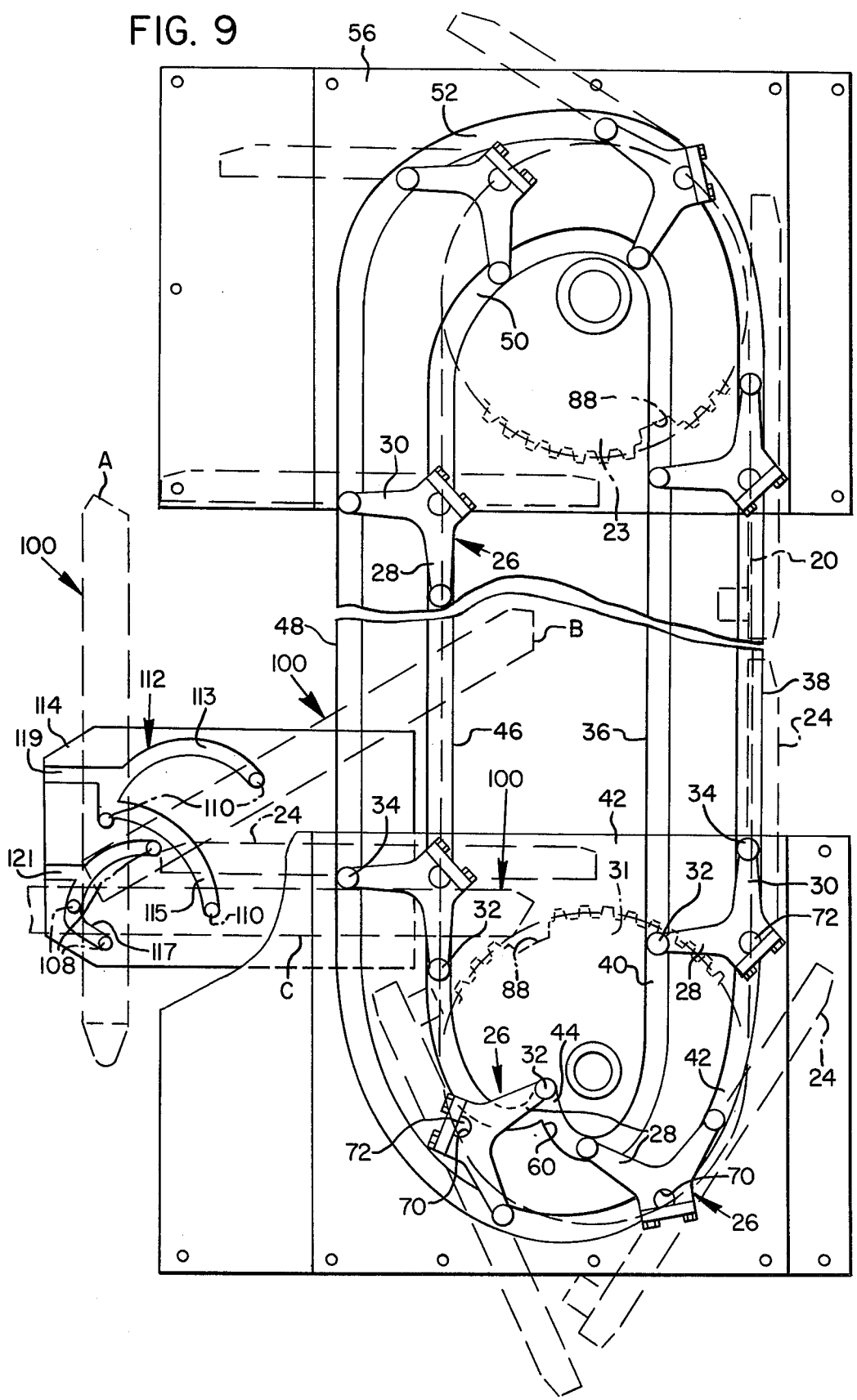

PACKAGE ELEVATOR FOR A SHIP

DESCRIPTION

This invention relates to an improved transport conveyor, and has for an object thereof the provision of a new and improved transport conveyor.

Another object of the invention is to provide a transport conveyor in which tined trays are turned only 90° relative to carrying chains when traveling around sprockets between return and transporting courses.

A further object of the conveyor is to provide a conveyor in which a pair of chains carry pairs of follower forks having follower rollers guided in cam tracks which, as the forks are moved around direction reversing sprockets, turn the forks only 90° to move tined trays carried by the forks between return positions lying along the chains to carrying positions extending at right angles to the chains.

In the drawings:

FIG. 5 is a schematic view of the conveyor of FIG. 1;

FIG. 6 is an enlarged, fragmentary front elevation view of the conveyor of FIG. 1;

FIG. 7 is a view taken along line 7—7 of FIG. 6;

FIG. 8 is a partly schematic, fragmentary, side elevation view of the conveyor of FIG. 1; and FIG. 9 is a schematic view of the conveyor of FIG. 1.

Figure 1:
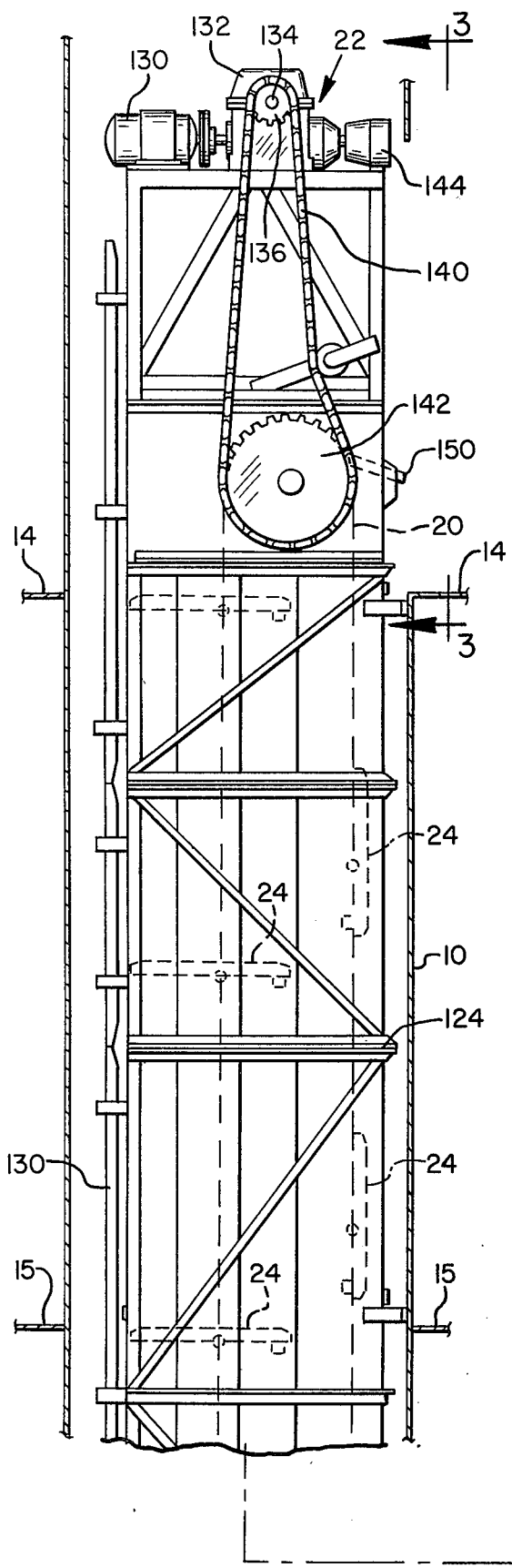
FIG. 1 is a staggered, vertical sectional view of a transport conveyor forming one embodiment of the invention.
Figure 1:
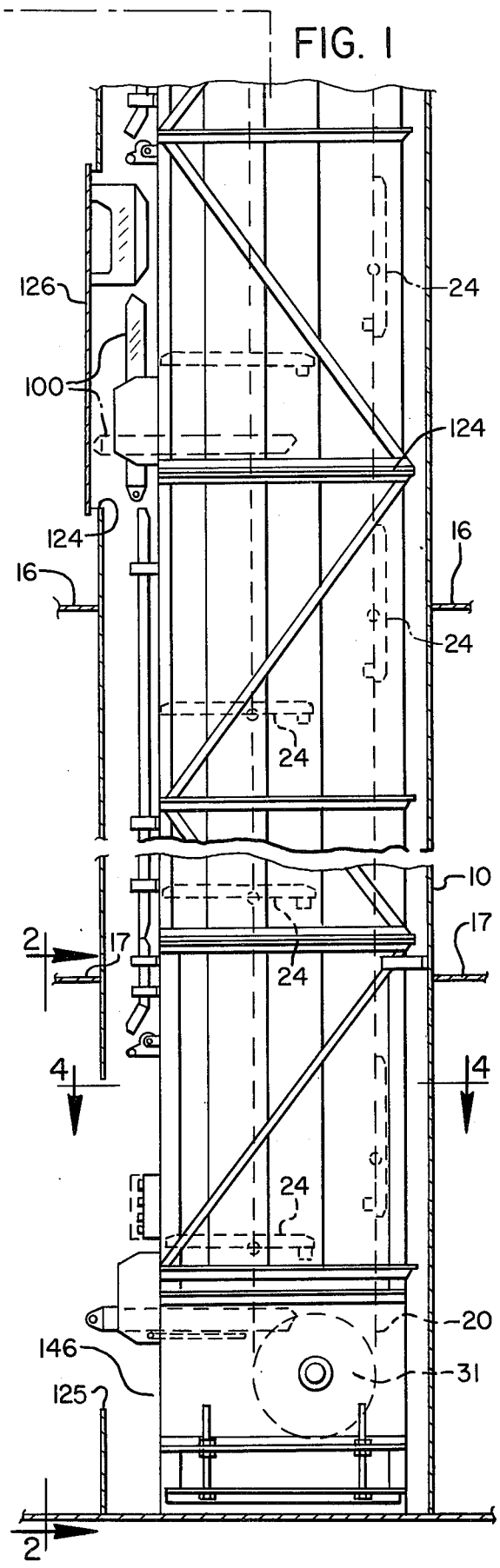
Figure 2:
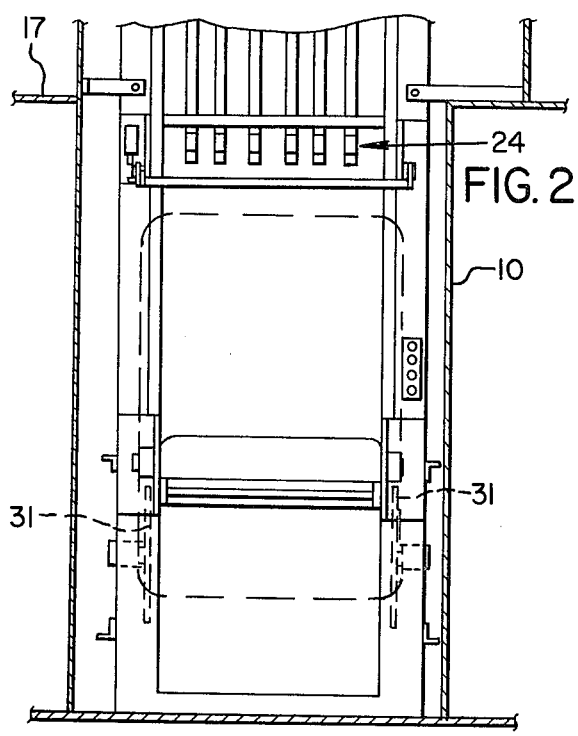
FIG. 2 is a vertical sectional view taken along line 2—2 of FIG. 1.
Figure 3:
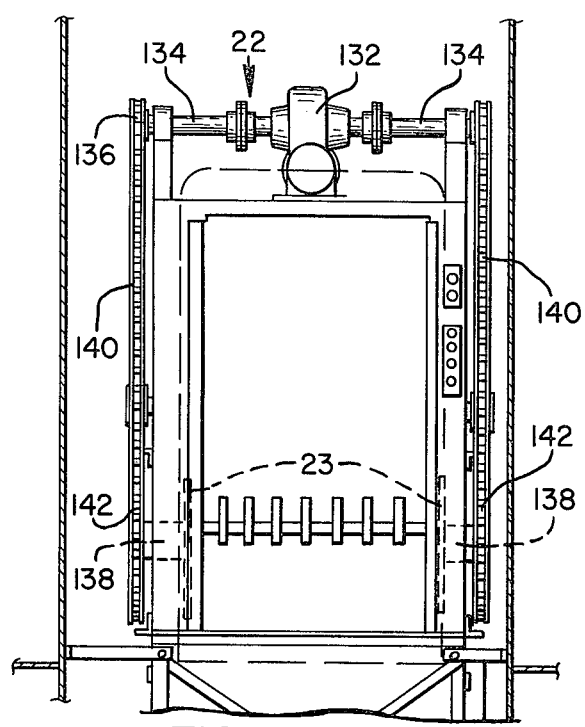
FIG. 3 is a vertical sectional view taken along line 3—3 of FIG. 1.

A transport conveyor forming one specific embodiment of the invention includes a hollow vertical shaft 10 installed in a ship and extending between several decks 14, 15, 16 and 17 of the ship. A pair of endless chains 20 are driven in either direction by a reversible drive 22 and drive sprockets 23, and carry forked or tined trays 24 by means of pairs of forked followers 26 each having an inner arm 28 and an outer arm 30 at right angles to the inner arm. The chains also travel around idler sprockets 31.

The inner and outer arms 28 and 30 carry follower rollers 32 and 34 respectively. As the chains are moved in the lifting direction, they move clockwise, as viewed in FIG. 9, and the trays 24 lay back between and generally parallel to the chains as they are moved downwardly along return courses in which the pairs of rollers 32 and 34 are guided by pairs of straight return channel-like cam tracks 36 and 38, which hold the trays in their folded back or retracted positions. Then, as each tray is moved around the idler sprockets 31, its associated pair of rollers 32 travel in and along a pair of parallel inner grooves 40 in a pair of cam blocks 42 and the pair of rollers 34 travel in and along a pair of parallel outer grooves 42 in the cam blocks. As the rollers 32 travel along the grooves 40, the grooves 40 turn in to somewhat heart-shaped or dimpled dwell notches 44, and, meanwhile, the rollers 34 travel along the grooves 42 and are swung forwardly relative to the rollers 32. Then, upon continued movement, the rollers 34 swing on ahead of the rollers 32 after which the rollers 32 move out of the dwell notches and trail the rollers 34. This swings the trays 90° forwardly, and the rollers then are moved along pairs of straight package elevating channel-like cam tracks 46 and 48.

The cam tracks 46 and 48 travel to inner cam grooves 50 and outer cam grooves 52 in upper cam blocks 56. The pairs of grooves 50 and 52 lead to the pairs of cam tracks 36 and 38 respectively, and, as the rollers travel therealong in the lifting mode of operation, the outer grooves 52 swing out from and then in toward the inner grooves 50 in the first half of the 180° turn and then the grooves turn more sharply and bring the rollers 32 to the tracks 36 and 38 with the arms 30 extending up. This positions the trays horizontally until they pass about halfway around the upper turn and then increasingly tilt the trays toward the right, as viewed in FIG. 9 to discharge any package carried thereby. Relative to the elevator frame, the trays are turned only 90° in the upper turn, 90° of the 180° turn of the chains being subtracted. Conversely, in the lower turn the trays are turned 270° relative to the elevator frame, a 90° turn relative to the chains being added to the 180° turn of the chains.

In the lowering mode of elevator operation, the chains are moved counter-clockwise, as viewed in FIG. 9, and the reverse of the paths described above are followed by the rollers 32 and 34, arms 28 and 30 and trays 24, the dwell notches 44 being substantially symmetrical. V-shaped portions 60 of the outer wall of the notches positively guide the rollers 32 into the delay notches to insure turning of the arms 28 and 30, the arms 28 being delayed 90° relative to the arms 30 in travel in both directions in the lower turn, the trays turning 90° further relative to the chains in travel in each direction of travel in the lower turn. The trays always extend parallel to the outer arms 30. The V-shaped portions 60 are complementary to the dimple of a heartshape and always direct the rollers 32 into the notches 44 to cause the 90° lag or delay of the arms 28 relative to the chains.

Each of the forked followers 26 has a partial bore 70 and is clamped to a shaft 72 by a plate 74 bolted to the follower 26 and bearing against a flat 76 on the shaft 72. The shaft 72 (FIGS. 6 and 8) is journaled in a sleeve 78 welded to a double length links 80 of the chain 20. Rollers 82 and links 84 and 86 are the other components of the chain. The sprockets 23 and 31 have clearance notches 88 (FIG. 8) for the sleeves 78.

Figure 4:
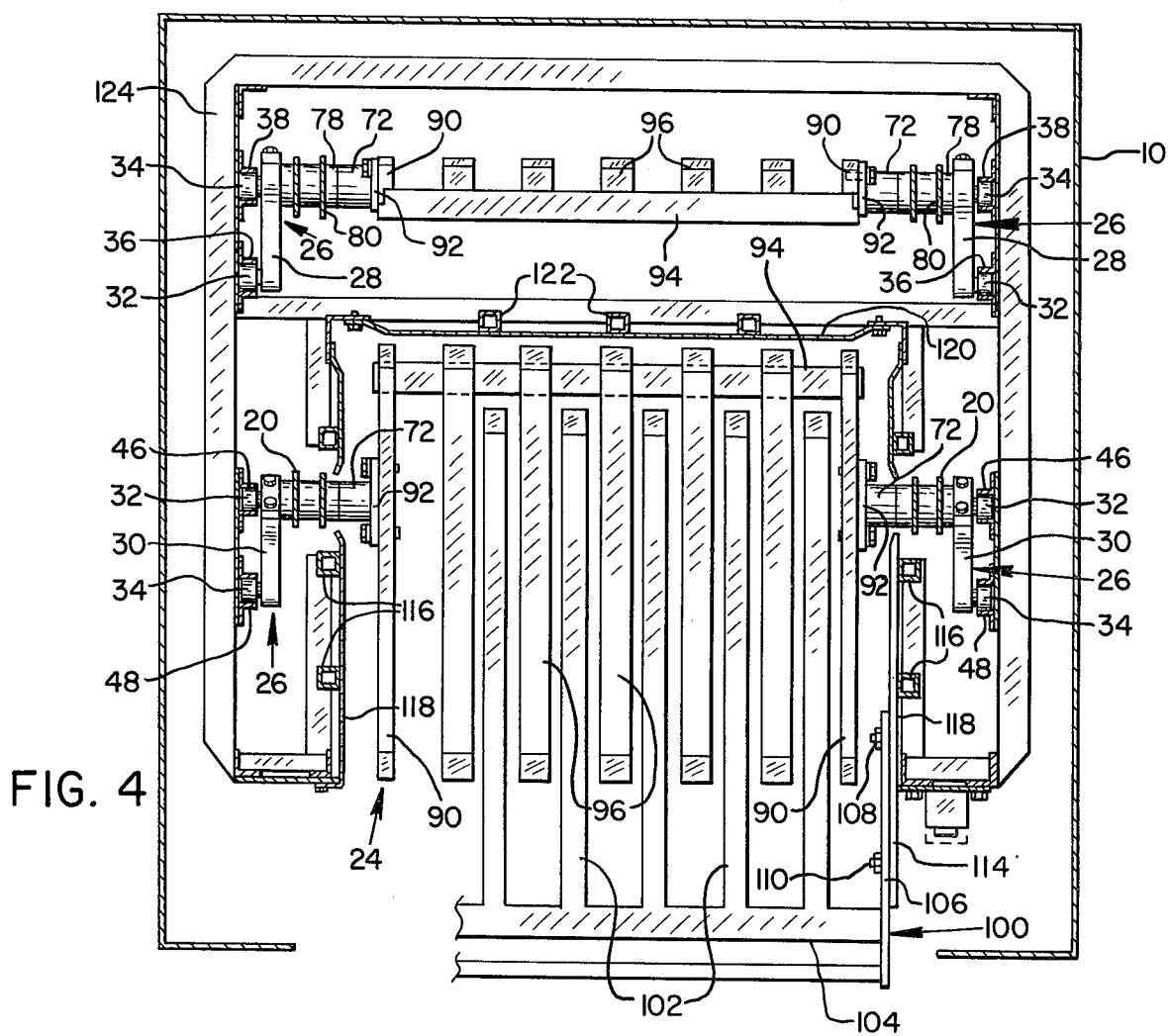
FIG. 4 is an enlarged, horizontal sectional view taken along line 4—4 of FIG. 1 and turned 90°.

The trays 24 (FIG. 4) are fork-like, and include outer bar-like tines 90 rigidly bolted to outer ends of arms 92 welded to the shafts 72. Rods 94 are welded to ends of the tines 90, and tines 96 are welded to the rods 94 to form the comb-like structure of the trays.

The comb-like trays 24 are adapted to pass through comb-like transfer trays 100 at the several lower decks 15, 16 and 17 (FIG. 1). Each tray 100 is adapted to be positioned selectively by an operator in a retracted position designated "A" in FIG. 9, in a sloping, unloading position designated "B" in FIG. 9 or a loading position designated "C" in FIG. 9. The tray 100 is comb-like with tines 102 interleaving the tines 90 and 96. The tines 102 are welded to base 104 carried by outer arms 106 having pins 108 and 110. The pins 110 are adapted to be moved from bottoms of a pair of slots 112 in cam plates 114 either along arcuate branch slots 113 to the sloping unloading positions or along arcuate branch slots 115 to the loading positions, the cam plates 114 being stationary and fixed to upright tubular posts 116. The pins 108 travel along arcuate slots 117 in the cam plates 114. Pairs of entrance slots 119 and 121 are provided also. The posts also support side plates 118 forming a chute or passageway with inner plate 120 supported by posts 122. A truss-like frame 124 supports the cam tracks 36, 38, 46 and 48, the cam blocks 42 and 56 and the drive 22. The shaft 10 has loading or unloading openings 125 at the several lower decks which are closable by watertight doors 126. For unloading packages 128 at the upper end of the elevator, the trays tilt to the right and downwardly as viewed in FIG. 5 to slide the packages 128 off the trays onto the upper deck 14. Guide posts 130 (FIG. 1) confine the packages to the trays 24 at the front side.

The drive 22 includes a motor 130, a gear reduction 132 and double-ended output shaft 134 driving sprockets 136 to drive stub shafts 138 through chains 140 and sprockets 142. The sprockets 23 are mounted on and keyed to the stub shafts 138 as are the pulleys 142. A stripping comb 150 (FIG. 1) is provided at the upper deck 14.

Each load/unload station has a push button station with three push buttons: "up", "down" and "stop", and an on/off switch which has a padlocked cover to prevent use by unauthorized persons. With the on/off switch in the "on" position, pushing the "up" or "down" push button will actuate a time delay relay which sounds a warning buzzer for 3 seconds, then starts the elevator in the proper direction. When the motor starts, a magnetic brake 144 is released. Pushing any "stop" button will cut off power to the motor, and the brake, which is spring actuated, will lock. If the elevator has to be operated when the overloads have turned it off an "emergency run" button is provided in the controller which, when pressed simultaneously with either the "up" or "down" button also in the controller, bypasses the overloads, and the elevator will operate. An interlock limit switch at each load station will prevent down operation if a load/unload tray is in the "load" position. A jam limit switch at each load/unload station will stop the elevator if a package projects into a doorway. A jam limit switch in the boot 146 will stop the elevator if a package is carried into the boot. An instantaneous overload control stops current to the motor in the event of an electrical overload. After the overload has been corrected, the elevator can be restarted. The I.O.L. does not have to be reset manually. A timer prevents the I.O.L. from working during starting.

What is claimed is:
1. In an elevator,
an endless chain,
a forked follower having an inner arm means and an outer arm means and mounted pivotally on the chain,
a carrier tray carried by the follower,
an inner endless guide track means for guiding the inner arm means,
an outer endless guide track means for guiding the outer arm means,
means guiding the chain along a conveying course, a first reversing turn portion, a return course and a second reversing turn portion,
the guide track means serving to guide the follower to have the carrier tray extend along the return course when carried therealong and to extend transversely to the conveying course when carried therealong,
the portion of the inner guide track means along one of the reversing turn portions having an inwardly extending notch for retarding the inner arm means 90° relative to the outer arm means as the arm means travel around said one of the reversing turn portions.

2. In an elevator,
a pair of endless chains,
a pair of drive sprockets meshing with the chains and reversing the direction of the chains,
a pair of idler sprockets meshing with the chains and reversing the direction of the chains,
a carrier tray,
a pair of forked followers carried pivotally by the chains and carrying the tray,
each of the followers including an inner arm and an outer arm,
a pair of follower rollers mounted on the arms,
a pair of parallel inner cam track means guiding the rollers on the inner arms,
and a pair of outer cam track means guiding the other rollers, the cam track means serving to guide the followers to advance the trays 90° at the idler sprockets and to retard the trays 90° at the drive sprockets,
the inner and outer cam track means, as they extend around the drive sprockets, initially diverge from each other and then converge toward each other,
the pair of inner cam track means have notches in the portions thereof extending around the idler sprockets to receive the rollers on the inner arms and retard the inner arms substantially 90° as the followers move around the idler sprockets,
the inner cam track means and the outer cam track means being completely separate and never crossing over each other.

3. In an elevator,
a pair of endless chains,
a pair of drive sprockets meshing with the chains and reversing the direction of the chains,
a pair of idler sprockets meshing with the chains and reversing the direction of the chains,
a carrier tray,
a pair of forked followers carried pivotally by the chains and carrying the tray,
each of the followers including an inner arm and an outer arm,
a pair of follower rollers mounted on the arms,
a pair of parallel inner cam track means guiding the rollers on the inner arms,
a pair of outer cam track means guiding the other rollers, the cam track means serving to guide the followers to advance the trays 90° at the idler sprockets and to retard the trays 90° at the drive sprockets,
the carrier tray being comb-like and including a comb-like transfer tray mounted at a loading and unloading station along one course of movement of the carrier tray,
and mounting means for selectively holding the transfer tray in an extended position in the path of the carrier and a retracted position out of that path,
the mounting means including means for holding the transfer tray in a sloping position extending into the path of the carrier tray for unloading a package being lowered by the carrier tray,
the mounting means also including means for holding the transfer tray in a horizontal position adapted to hold a package in the path of the carrier tray for the carrier tray to pick up and raise, the mounting means including pairs of pins on the transfer tray and a pair of members having forked slots for one pin of each pair, the pair of members including one pair of forked slots for holding one pair of pins to locate the transfer tray in the horizontal position and a second pair of slots for holding a second pair of pins to locate the transfer tray in the sloping position.

4. In an elevator, a pair of endless chains, a pair of drive sprockets meshing with the chains and reversing the direction of the chains, a pair of idler sprockets meshing with the chains and reversing the direction of the chains, a carrier tray, a pair of forked followers carried pivotally by the chains and carrying the tray, each of the followers including an inner arm and an outer arm, a pair of follower rollers mounted on the arms, a pair of parallel inner cam track means guiding the rollers on the inner arms, and a pair of outer cam track means guiding the other rollers, the cam track means serving to guide the followers to advance the trays 90° at the idler sprockets and to retard the trays 90° at the drive sprockets, the carrier tray being comb-like and including a comb-like transfer tray mounted at a loading and unloading station along one course of movement of the carrier tray, and mounting means for selectively holding the transfer tray in an extended position in the path of the carrier and a retracted position out of that path, the mounting means including means for holding the transfer tray in a sloping position extending into the path of the carrier tray for unloading a package being lowered by the carrier tray, the holding means including two pairs of pins on the transfer tray and a pair of fixed members having two pairs of curved slots receiving and guiding the pairs of pins, one pair of the curved slots receiving one pair of the pins to hold the tray selectively in either a retracted position or the sloping position, the other pair of curved slots receiving the other pair of pins to hold the tray selectively in either the retracted position or the horizontal position.

5. The elevator of claim 4 wherein the holding means comprises pairs of pins on the transfer tray and a pair of fixed members having pairs of curved slots receiving and guiding the pairs of pins.

6. The elevator of claim 1 wherein the portion of the outer guide track means along one of the reversing turn portions is substantially longer than the adjacent portion of the inner guide track means for retarding the outer arm means 90° relative to the inner arm means as the arm means travel around said one of the reversing turn portions.

* * * * *